United States Patent [19]
Dyer et al.

[11] 3,753,283
[45] Aug. 21, 1973

[54] ELECTRODE TIP EXTRACTING TOOL

[75] Inventors: Rex H. Dyer, Independence, Mo.;
Lauren W. Burnett, Dubuque, Iowa

[73] Assignee: Dyer Weld Tool Corp., Lexington, Mo.

[22] Filed: Apr. 24, 1972

[21] Appl. No.: 246,612

[52] U.S. Cl. ................ 29/267, 254/23, 254/131
[51] Int. Cl. .......................................... B23p 19/04
[58] Field of Search ............... 29/267, 283, 244; 254/21, 22, 23, 24; 81/3 R

[56] References Cited
UNITED STATES PATENTS
2,245,838  6/1941  Taylor ................................ 29/267
1,103,767  7/1914  Henrickson ....................... 254/22

Primary Examiner—Othell M. Simpson
Assistant Examiner—Harold P. Smith, Jr.
Attorney—Claude A. Fishburn, Orville O. Gold et al.

[57] ABSTRACT

A tool for extracting electrode tips from the holder of a welding machine includes clamping jaws cooperating with a rigid jack-saddle which is forced away from the jaws by a pair of cams simultaneously actuated by an elongated handle. An upwardly open cavity bounded by the cams contains the jaws and is adapted to receive either straight or off-set electrode tips for extraction.

9 Claims, 6 Drawing Figures

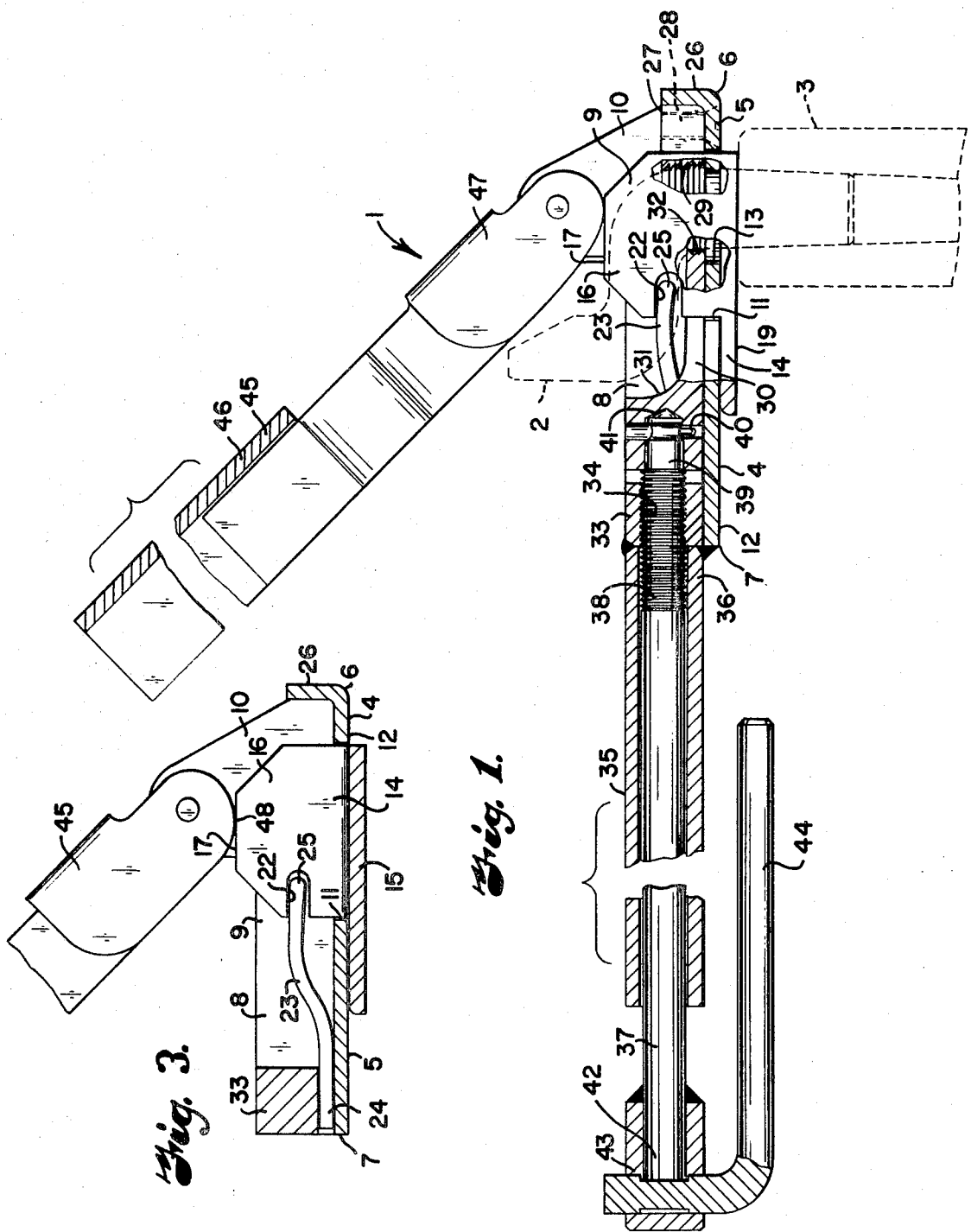

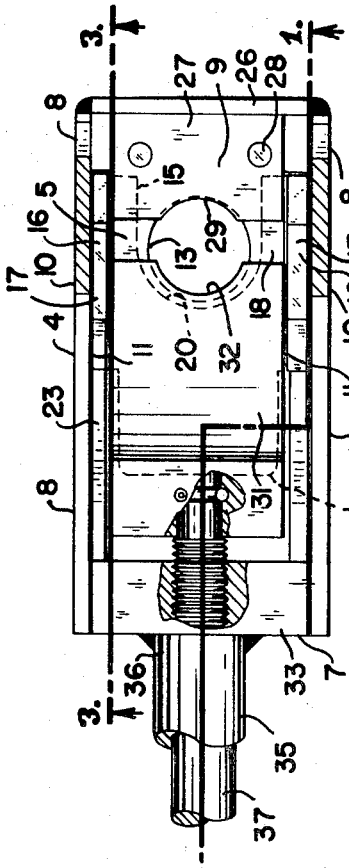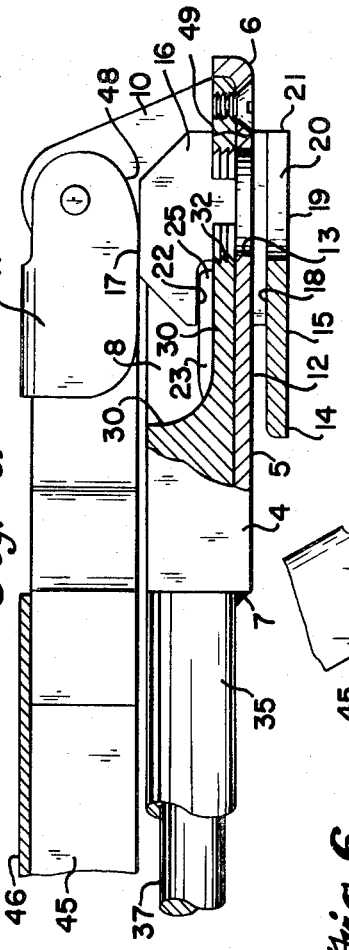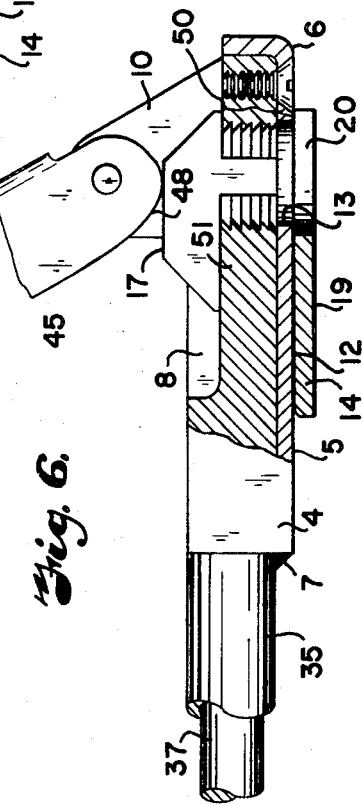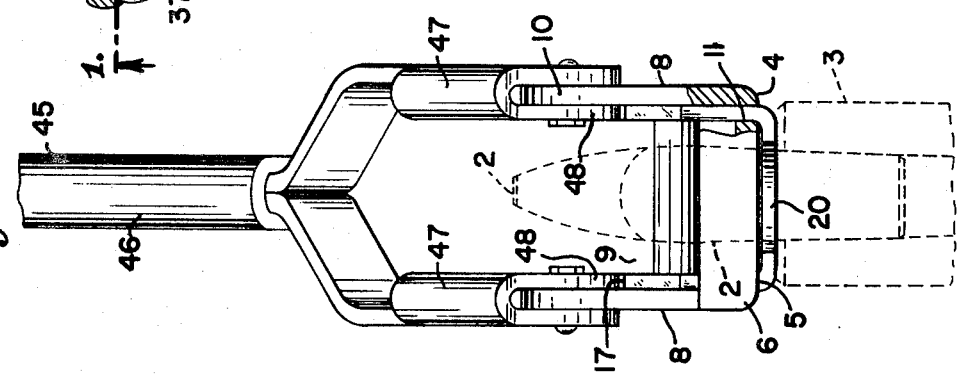

ELECTRODE TIP EXTRACTING TOOL

This invention relates to tools for extracting the electrode tips from welding machines with minimal effort and damage to the tips or holders therefor.

The electrode tips of welding machines commonly have tapered shanks that are wedged into receiving sockets or holders. Scale and corrosion often collect around the shanks, making it difficult to withdraw the tips when it is necessary for them to be repaired or replaced. The tip material is normally of relatively soft material and susceptible to damage if excessive pressure is applied. Likewise, the sockets or holders of the welding machines must be maintained in good condition so as to properly receive and retain the replacement tips and avoid the leakage of cooling fluid which is normally directed into the tip during machine operation.

The principal objects of the present invention are: to provide an electrode tip extracting tool which is adapted to withdraw electrode tips quickly and easily from welding machine holders; to provide such a tool which functions with minimal damage to both the tip and holder therefor; to provide such a tool arrangement which is adapted to extract either straight tips or off-set tips with equal facility; and to provide such a tool which is relatively simple and inexpensive in construction and well adapted for its intended purpose.

Other objects and advantages of this invention will become apparent from the following description taken in connection with the accompanying drawings wherein are set forth by way of illustration and example certain embodiments of this invention.

FIG. 1 is a fragmentary, cross-sectional, side elevational view taken on the line 1—1, FIG. 2, showing a tool embodying this invention.

FIG. 2 is a fragmentary plan view of the tool of FIG. 1 with portions broken away to show details of interior construction.

FIG. 3 is a cross-sectional, fragmentary, side elevational view through the tool taken on the line 3—3, FIG. 2.

FIG. 4 is a fragmentary front end elevational view of the tool.

FIG. 5 is a fragmentary side elevational view of a slightly modified form of the tool which utilizes a pair of thin clamping jaws.

FIG. 6 is a fragmentary side elevational view showing a further modified form of tool which utilizes a pair of thicker clamping jaws.

Referring to the drawings in more detail:

The reference numeral 1, FIG. 1, indicates a tool, embodying this invention, for extracting a tip 2 (here illustrated as an off-set tip) from the socket or holder 3 of a welding machine. The tool 1 includes a rigid elongated body 4 having a bottom wall 5 with a front end 6 and a rear end 7. The body 4 includes a pair of spaced-apart riser walls 8 projecting upwardly from the bottom wall 5 and forming an upwardly open cavity 9, FIG. 2, therebetween. Portions 10 of the riser walls 8 form mounting ears which project above the remainder of the walls 8 for a purpose discussed below.

A pair of spaced-apart elongated parallel slots 11 extend through the bottom wall 5 and open from the underside 12 thereof into the cavity 9. The slots 11 are respectively located adjacent the riser walls 8 as best illustrated in FIG. 2. A circular tip-receiving opening 13 extends through the bottom wall 5 between the slots 11.

A rigid jack-saddle 14 has a bottom plate 15 and a pair of spaced-apart parallel side plates 16 provided with upper cam surfaces 17. The bottom plate 15 has an upper surface 18 near and facing the body bottom wall 5 and a lower surface 19. The bottom plate 15 also contains a tip-receiving opening 20 therethrough aligned with the bottom wall opening 13 and located between the side plates 16. In this example the opening 20 takes the form of a "U" cut-out extending rearwardly from the front edge 21 of the bottom plate 15. The side plates 16 respectively project through the bottom wall slots 11 and extend into the cavity 9 along the inside of the respective riser walls 8.

A notch 22, FIG. 3, extends into each of the side plates 16, opening rearwardly thereof. A pair of elongated spring arms 23 respectively have a first or rear end 24 (FIG. 3) anchored to the body 4 near the bottom wall rear end 7 and a front or second end 25 engaged into one of the slot plate notches 22. The spring arms 23 resiliently urge the side plate 16, and therefore the jack-saddle bottom plate 15, upwardly toward the bottom wall 5.

The bottom wall front end 6 has a rigid, integral abutment 26 projecting upwardly therefrom and partially closing the forward part of the cavity 9. A first tip jaw 27 is secured by means of suitable screws 28 within the cavity 9 and adjacent the bottom wall front end 6. The tip jaw 27 engages against the abutment 26 thereby aiding in preventing movement thereof with respect to the body 4 when pressure is applied in the forward direction. The tip jaw 27 has a curved, serrated, surface 29 aligned with the tip receiving opening 13 but overlapped so that the body of the tip 2, which extends through the opening 13, will engage the serrated surface 29 without contacting the wall of the opening 13.

A second tip jaw 30 is located in the cavity 9 and is slideable along the bottom wall 5 toward mating relation with the first tip jaw 27. The tip jaw 30 has a substantial cut-out portion 31, FIG. 1, to provide ample clearance for the off-set tip 2. The second tip jaw 30 includes a curved, serrated surface 32 similar but opposed to the tip jaw serrated surface 29.

A block 33 is fixed to the body 4 near the body rear end 7 and has a threaded bore 34 therethrough extending longitudinally of the cavity 9. A tube handle 35 is fixed at one end 36 to the lock 33, as by welding, and extends rearwardly of the body 4. A shaft 37 is slideably and rotatively received within the tube handle 35 and has a threaded section 38 threadedly engaged in the bore 34. The shaft 37 extends forwardly through and beyond the block 33 and has an end 39 rotatably connected to the second tip jaw 30, in this example, by means of suitable pins 40, FIG. 1. The pins 40 serve mainly to prevent the end 39 from being retracted from the tip jaw 30, forward pressure from the shaft 37 to the tip jaw 30 being transferred primarily by contact at the shaft tip at 41.

The other end 42 of the shaft 37 projects rearwardly beyond the tube handle 35 and terminates in a receiver 43 which pivotally supports a lateral lever 44. The lever 44 is adapted to pivot at substantially right angles to the shaft 37 and this position is used for selectively rotating the shaft 37 with great mechanical advantage. It is apparent that rotation of the shaft 37 will result in the tip jaw 30 sliding forwardly toward the tip jaw 27, causing the tip 2 to be clamped between the jaws with considerable force, FIG. 1.

A cam handle 45 comprises a handle portion 46 normally projecting over the tube handle 35 and a pair of cam arms 47 which branch from the handle portion. The cam arms are respectively pivotally mounted on the portions 10 of the riser walls 8 and have cam surfaces 48 slideably engaging the side plate cam surfaces 17. By pivoting the cam handle 45 about the riser walls 8, the bottom plate 15 of the jack-saddle 14 is urged away from the bottom wall 5 as best shown by comparing FIGS. 5 and 6.

In operation, the shaft 37 is rotated so as to withdraw the second tip jaw 30 away from the first tip jaw 27 thereby providing clearance for inserting the tip 2 through the opening 13 and through the cavity 9, FIG. 1. The cam handle 45 is raised whereupon the spring arms 23 urge the jack-saddle bottom plate 15 into contact with the body bottom wall 5. With the bottom plate lower surface 19 in contact with the welding machine socket or holder 3, the shaft 37 is rotated in the opposite direction, bringing the serrated surfaces 29 and 32 into clamping engagement about the tip 2. The cam handle 45 is then urged toward the tube handle 35 forcing the jack-saddle bottom plate 15 away from the body bottom wall 5, thereby causing the tip to be lifted with great force out of the holder 3.

Because the jack-saddle 14 is relatively loosely retained in the body 4, it is able to pivot under pressure and thereby seek alignment against the flat top of the holder 3, obtaining a large area of contact and minimizing the danger of deforming the holder 3 during extraction. The tip 3, after a short displacement, may be easily removed from the holder, and then from the tool by backing off the second tip jaw 30 and withdrawing the tip either upwardly or downwardly from the cavity 9.

In FIG. 1 the height of the first tip jaw 27 is greater than that of the second tip jaw 30 adjacent the respective serrated clamping surfaces. This provides for maximum clamping surface on the convex curvature of the tip 2 for minimal damage to the tip. On the concave curvature of the tip, that is, where it curves into the off-set portion, the jaw is thin to provide clearance. In FIG. 5, the construction is similar to that of FIG. 1, however the first tip jaw 49 is of the same short height as the second tip jaw 30. This arrangement is most desirable where conditions do not permit assurance that the off-set of the tip will extend rearwardly within the cavity 9. The embodiment shown in FIG. 6 utilizes a thick first tip jaw 50 cooperating with a thick second tip jaw 51. This arrangement is best utilized for withdrawal of straight tips where clearance under an off-set does not present a problem.

It is to be understood that while certain forms of this invention have been illustrated and described, it is not to be limited thereto except insofar as such limitations are included in the following claims.

What is claimed and desired to secure by Letters Patent is:

1. A tool for extracting an electrode tip from a welding machine tip holder comprising:
   a. a body having a bottom wall with a front end and a rear end and a pair of spaced-apart riser walls projecting upwardly from said bottom wall and forming a cavity therebetween, a pair of spaced-apart slots extending through said bottom wall and opening into said cavity, a tip-receiving opening extending through said bottom wall between said slots,
   b. a jack-saddle having a bottom plate and a pair of spaced-apart parallel side plates provided with respective cam surfaces, said bottom plate having a tip receiving opening therethrough aligned with said bottom wall opening, said side plates slideably projecting through said bottom wall slots and extending upwardly into said cavity,
   c. a first tip jaw fixed to said body within said cavity and adjacent said bottom wall opening, a second tip jaw in said cavity and slideable along said bottom wall toward mating relation with said first tip jaw adjacent said bottom wall opening, means on said body for selectively urging said second tip jaw toward said first tip jaw, and
   d. a cam handle having a pair of cam arms respectively pivotally mounted on said riser walls and having cam surfaces slideably engaging said side plate cam surfaces, whereby pivoting said cam handle about said riser walls urges said bottom plate away from said bottom wall.

2. The tool as set forth in claim 1 wherein:
   a. said bottom wall slots are respectively located adjacent said riser walls.

3. The tool as set forth in claim 1 wherein:
   a. a notch extends into each said side plates and opens rearwardly of said bottom wall, and including
   b. a pair of spring arms respectively having a first end anchored to said body near said bottom wall rear end and a second end engaged into one of said side plate notches, said spring arms resiliently urging said jack-saddle bottom plate toward said bottom wall.

4. The tool as set forth in claim 1 wherein:
   a. said bottom plate front end has an abutment projecting upwardly therefrom, and
   b. said first tip jaw engages said abutment.

5. The tool as set forth in claim 1 wherein said second tip jaw urging means includes:
   a. a block fixed to said body near said body rear end and having a threaded bore therethrough extending longitudinally of said cavity,
   b. a tube handle fixed at one end to said block and extending rearwardly of said body,
   c. a shaft slideably and rotatably received in said tube handle and having a threaded section threadedly engaged in said threaded bore, said shaft extending forwardly beyond said block and having an end rotatably connected to said second tip jaw.

6. The tool as set forth in claim 5 wherein:
   a. said shaft has another end projecting rearwardly beyond said tube handle, and including
   b. a lateral lever engaging said shaft other end for selectively rotating same.

7. The tool as set forth in claim 1 wherein:
   a. said cam handle comprises a handle portion branching into said cam arms.

8. A tool for extracting an electrode tip from a welding machine tip holder including:
   a. a body having a bottom wall, a tip-receiving opening extending through said bottom wall,
   b. a jack-saddle having a bottom plate near said body bottom wall, said bottom plate having a tip-receiving opening coincident with said bottom wall opening, c. means for clamping said tip within said body while extending through said bottom wall opening and bottom plate opening, and
d. means for selectively separating said bottom plate from said bottom wall.

9. The tool as set forth in claim 8 wherein:
a. said separating means includes a cam.

* * * * *